L. C. NICHOLSON.
CIRCUIT CONTROLLING APPARATUS.
APPLICATION FILED JULY 22, 1908.
959,788.
Patented May 31, 1910.
7 SHEETS—SHEET 4.
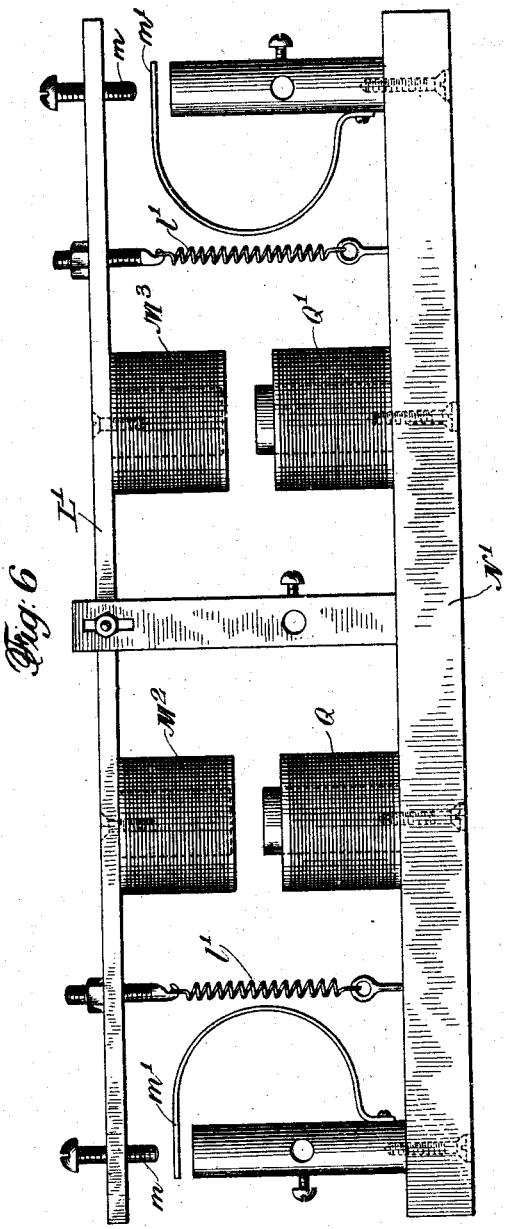
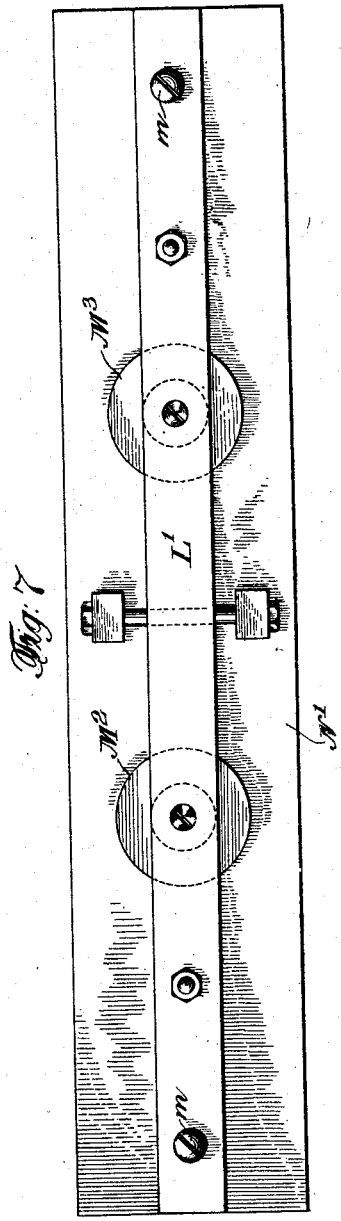

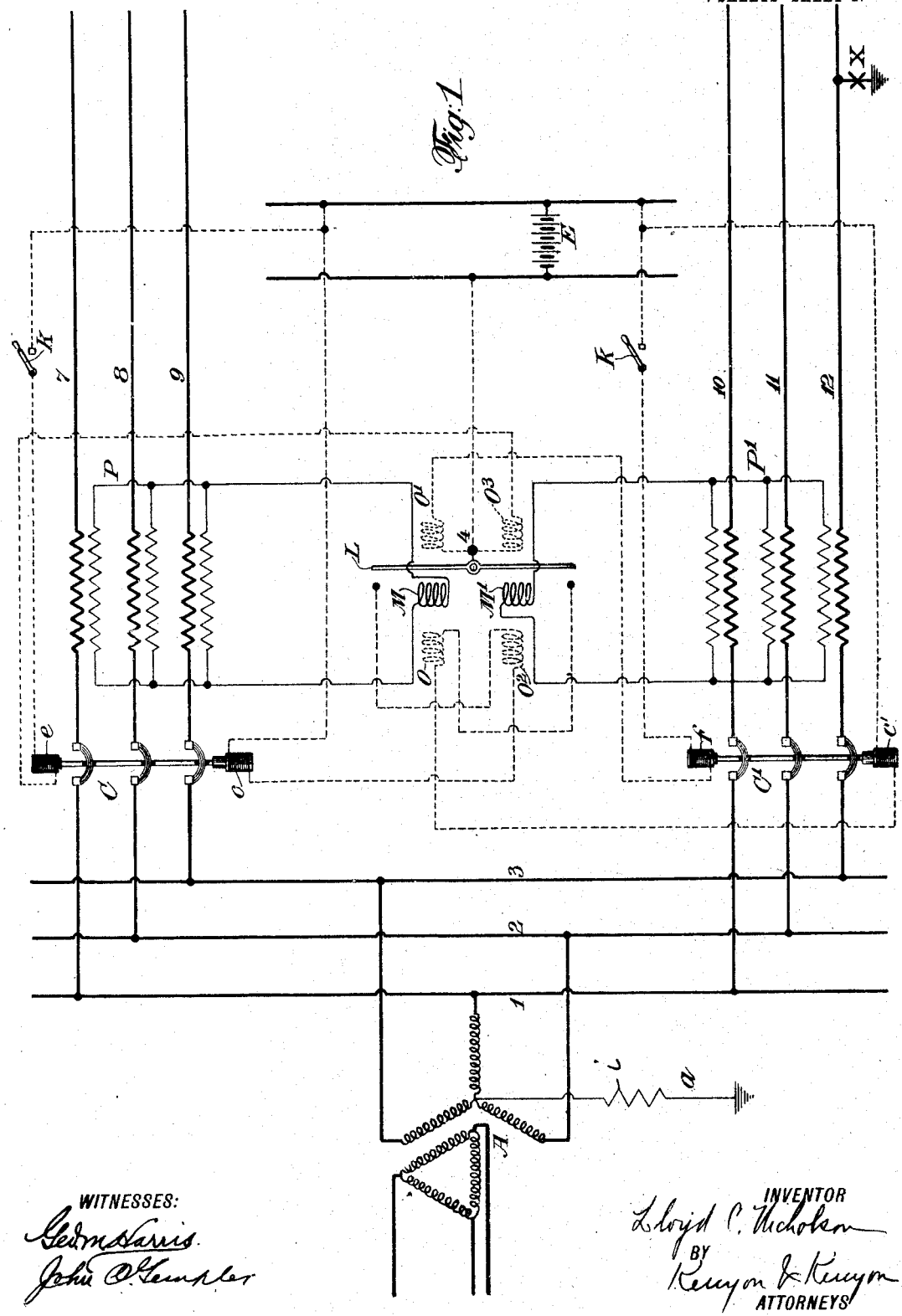

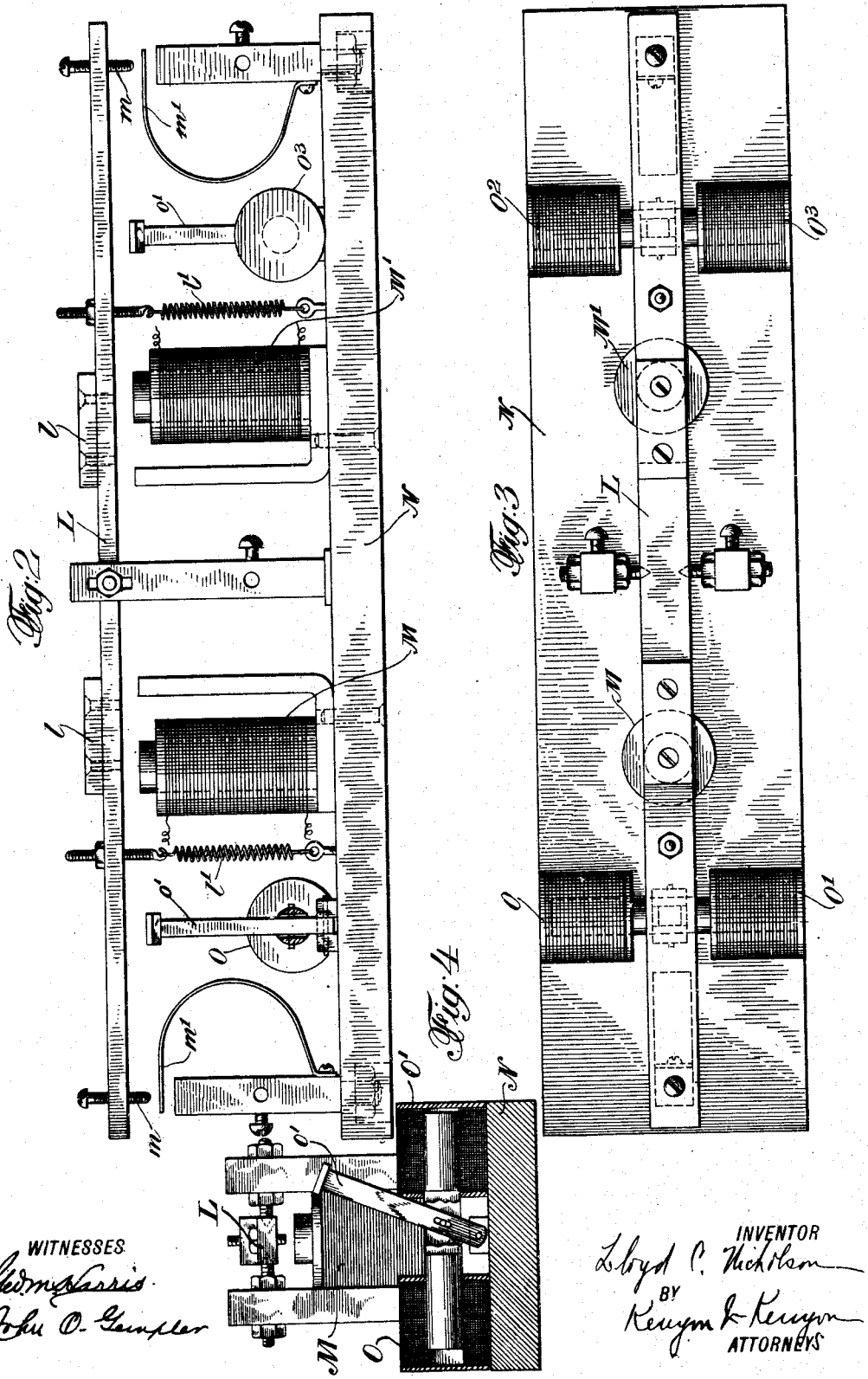

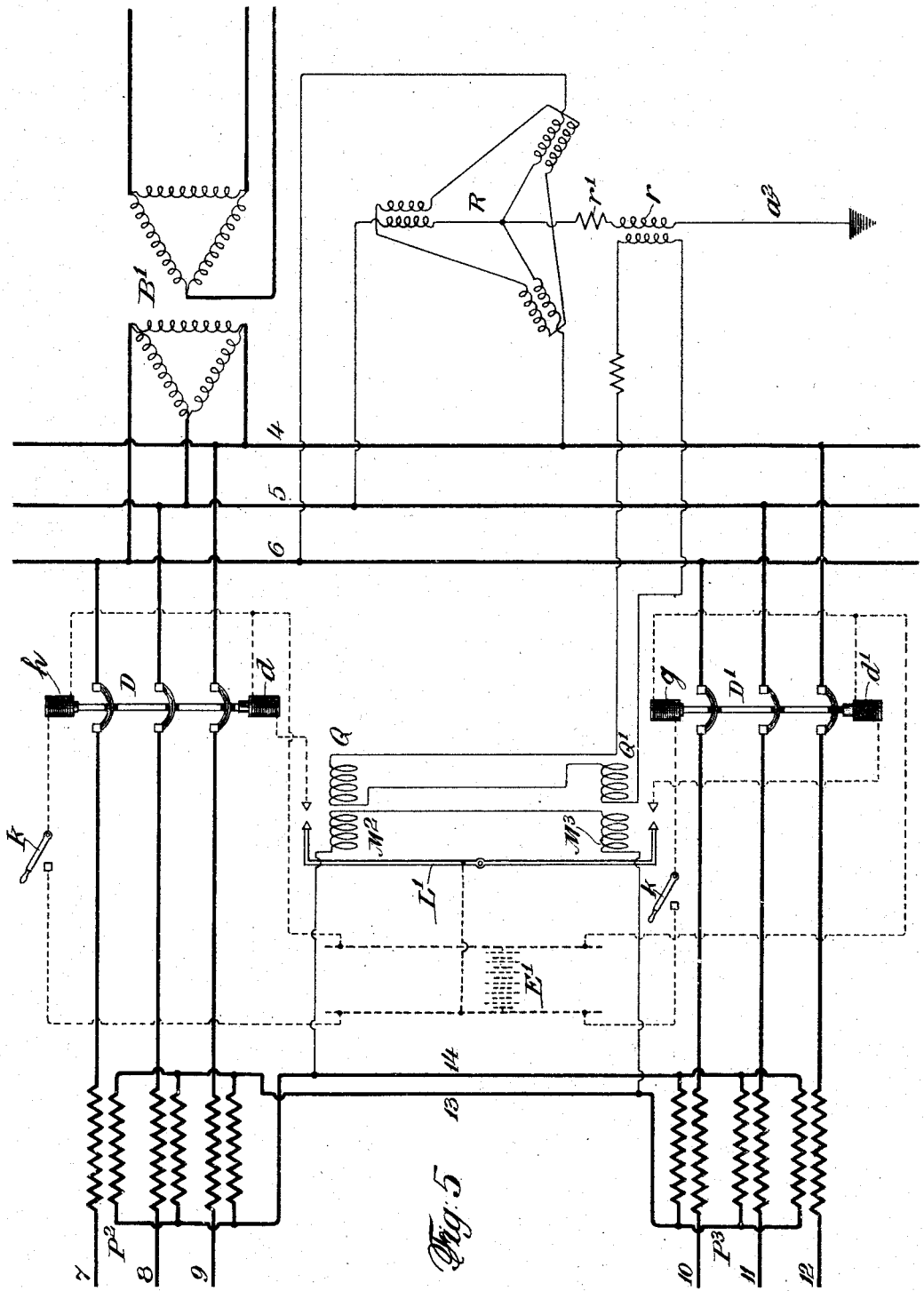

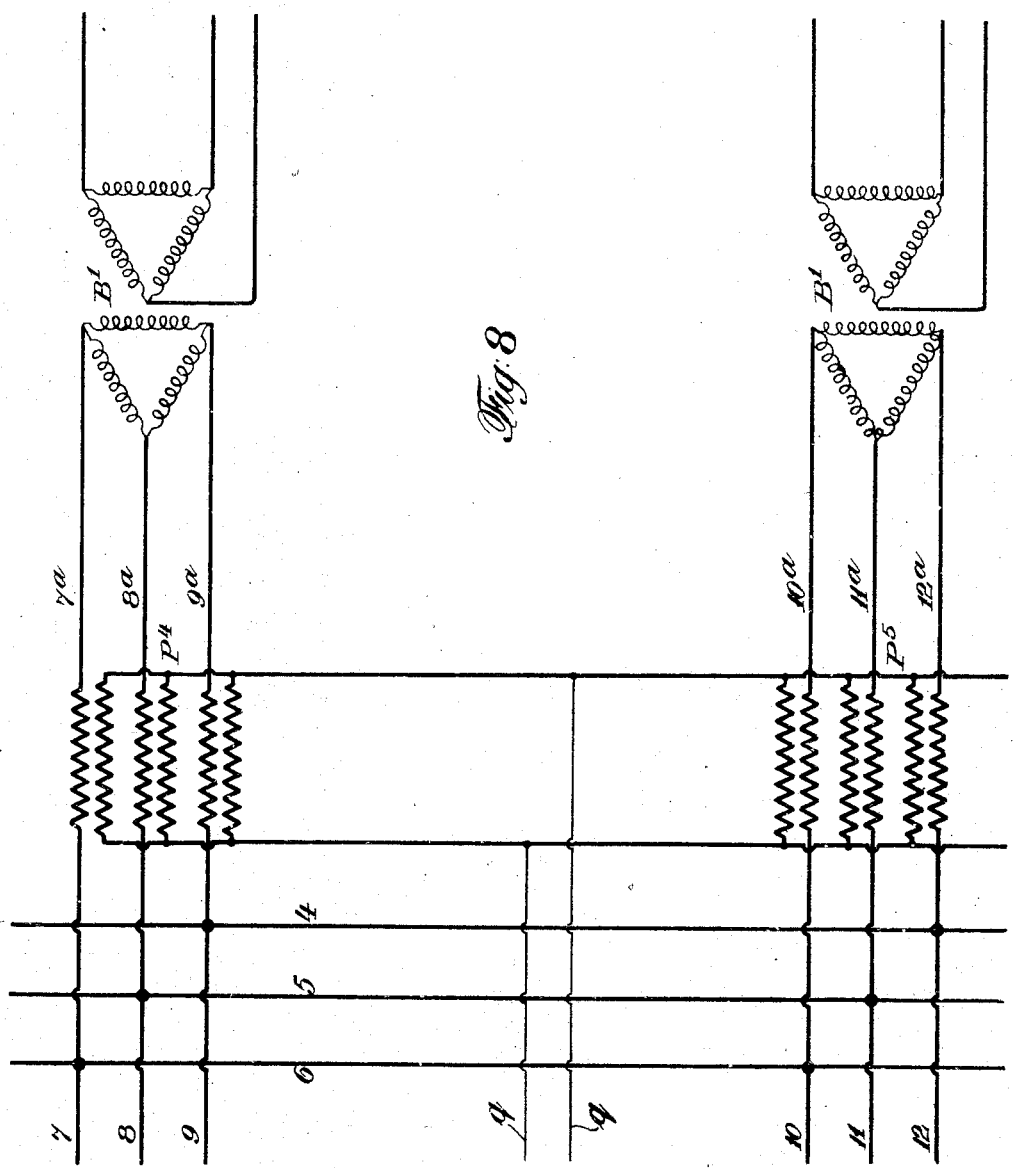

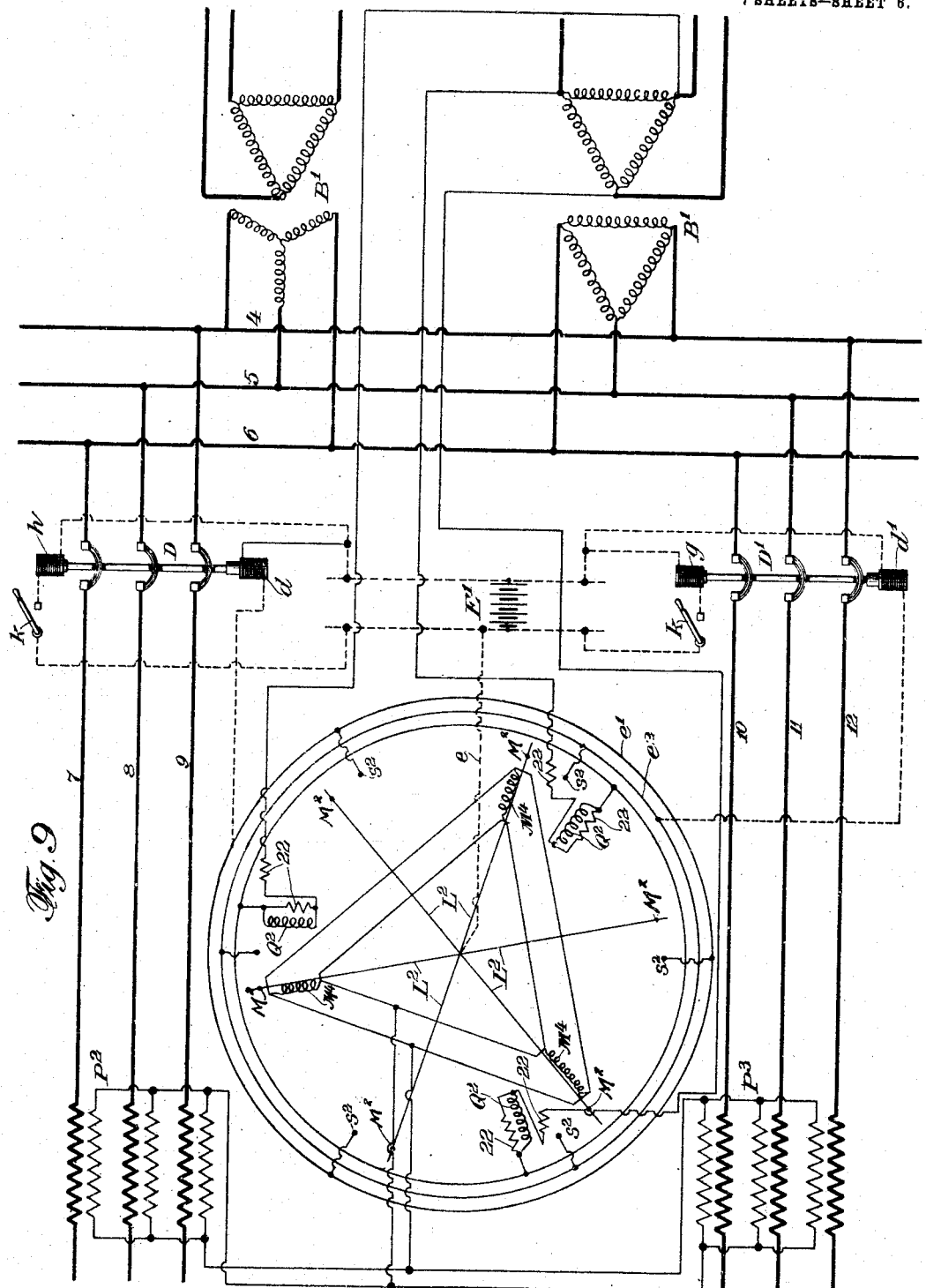

L. C. NICHOLSON.
CIRCUIT CONTROLLING APPARATUS.
APPLICATION FILED JULY 22, 1908.
959,788.
Patented May 31, 1910.
7 SHEETS—SHEET 7.
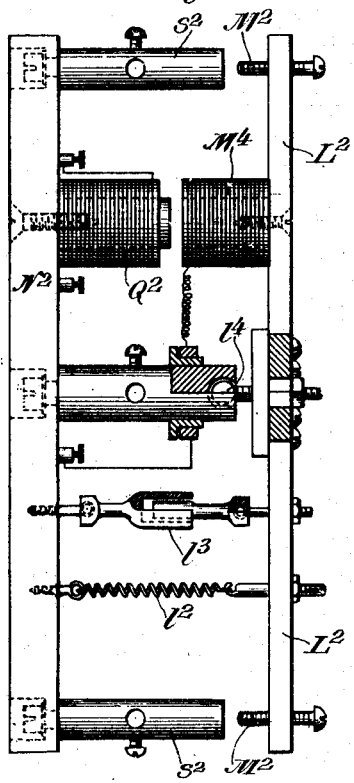
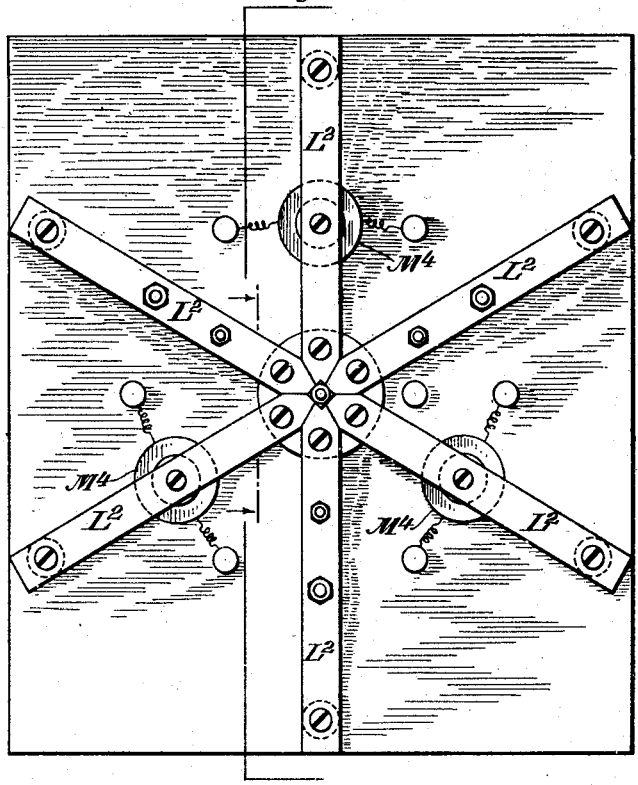
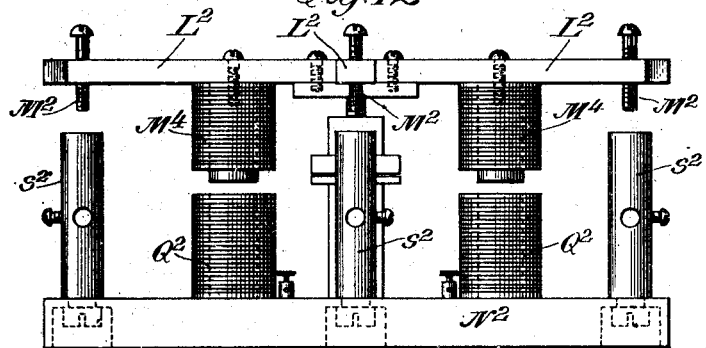

UNITED STATES PATENT OFFICE.

LLOYD CARLTON NICHOLSON, OF BUFFALO, NEW YORK.

CIRCUIT-CONTROLLING APPARATUS.

959,788.  Specification of Letters Patent.  Patented May 31, 1910.

Application filed July 22, 1908. Serial No. 444,712.

*To all whom it may concern:*

Be it known that I, LLOYD C. NICHOLSON, a citizen of the United States, and a resident of Buffalo, county of Erie, State of New York, have invented certain new and useful Improvements in Circuit-Controlling Apparatus, of which the following is a specification.

My invention relates to the protection of transmission lines from the results of a fault developed on any conductor of the line.

My invention is especially applicable to polyphase transmission lines, although some features of my invention have utility apart from their use on a polyphase transmission line.

It is customary in transmitting power of high tension over considerable distances to supply two or more independent transmission lines connected together both at the power and at the receiving ends of the line, thus enabling either line to be employed in case the other or others are put out of commission. It is desirable to disconnect both ends of a transmission line upon which the ground occurs and to do so with as little injury or strain to the power station as possible.

One object of my invention is to provide a system having only two parallel transmission lines connecting the power and receiving stations and so arranged as to disconnect a faulty transmission line at both ends of the line immediately upon the development of a fault in the line and regardless of the position of the fault. Certain means for disconnecting a faulty line have been heretofore proposed but they fail in practice unless more than two transmission lines are provided, or unless there is a generating station at each end of the line.

Another object of my invention is to provide apparatus for automatically cutting out the faulty line that will act positively and certainly regardless of any unequal division of the working load between the two transmission lines and regardless of whether branch load lines are connected to one or other transmission line between the power and receiving stations, and regardless of any differences that may exist in the lengths of the different transmission lines or their conductive capacities.

In another application for Letters Patent Serial No. 444,711 filed on an even date herewith I have described and claimed a system having apparatus arranged to achieve this broad object and in said application I have described among others a system embodying some of the features of my present invention in order to illustrate the broad scope of the invention of said application.

The present application is in part an improvement upon the invention claimed in my other application, including modifications thereof involving independent invention.

In my said other case I have shown at the power end of the transmission line a pair of circuit breakers both in operative relation to a relay which is oppositely acted upon by two coils which receive respectively the algebraic sums of the currents of the two transmission lines at their power ends. At the receiving station at the distant end of the transmission lines I also showed a similar arrangement with means for causing the two algebraic sums at the receiving station to be included, and I also showed another arrangement for actuating the circuit breakers at the receiving station. The specific invention of the latter arrangement forms the subject matter of the present invention. While this means for opening the circuit breakers at the receiving station may be used at the power station as well, yet I herein show the same apparatus at the power station as I showed in my other application since I prefer to use this form of apparatus thereat.

The present invention relates to the apparatus which I herein show applied to a receiving station and which has certain important advantages for use at that station.

In accordance with my invention I provide each transmission line with a circuit breaker and cause the circuit breakers to be selectively actuated when there is a fault on either line by causing a co-action between two currents, one of which is produced through means responsive to the development of a fault and is of different phase according to whether the fault develops in one line or the other. The other of these currents is a current that has the same phase relation whichever line is the faulty one. The first of these currents is preferably supplied to a coil or coils which in the absence of a fault are without current and this current is the resultant of two electro-motive-forces or currents, one produced by the flow of current to a fault through one of the transmission lines, and the other produced by a flow of current to the same fault through the other transmission line. Preferably these currents which form the resultant each correspond in value to the algebraic sums of the currents of the two transmission lines, the preferred way of providing this resultant current being to supply series transformers in all of the conductors, connecting the secondaries of each set of transformers in parallel, and reversely connecting the two sets of transformers to an external circuit across which is connected the coil or coils that are to receive the resultant current. The second current above referred to, namely, the one that has the same phase relation whichever line is at fault, may be supplied in a variety of ways, preferably, but not necessarily, by means responsive to the development of a fault, and is delivered to a coil or coils which is or are arranged in proximity to the coil or coils carrying the said resultant current, the two sets of coils being carried upon relatively movable bodies, whereby the alternate attraction and repulsion exerted by any adjacent pair of coils can act upon a moving arm or relay that is operatively arranged to actuate the circuit breakers. By this arrangement of apparatus I am enabled to provide apparatus which will, independent of the connection of power transformers that may be desired at the receiving station, positively actuate the proper circuit breaker at the receiving station without depending upon the relative action of time limit devices and without regard to whether or not a load is taken from the transmission line by branch lines. Moreover, I may, if desired, by following out the principles of this invention, not only actuate the proper circuit breaker, but simultaneously indicate which conductor of the faulty line contains the fault. These results can be obtained whether the power and receiving stations are connected by only two lines or more than two lines, and without relying upon any source of power at the receiving station. The problem at the receiving station has heretofore been one of considerable difficulty where only two transmission lines are employed.

Another specific feature of my invention which is not, however, essential to the employment of my broad invention relates to the provision of apparatus whereby advantage is taken of the charging current in the conductors that are not at fault and the absence of charging current in the faulty conductor to provide a current that may be used to actuate a relay. Specifically I employ this difference between the charging currents of the three conductors to produce a current that has a definite phase relation to the normal phase of the faulty conductor regardless of whether that conductor is on one line or the other.

I have illustrated in the drawings several modifications of my broad invention and will particularly describe the same and then set out the invention in the appended claims.

Referring to the drawings,—Figure 1 is a diagrammatic illustration of the power station end of a transmission line with the two transmission lines extending therefrom. Figs. 2 and 3 are side and plan views, respectively, of the relay indicated in Fig. 1. Fig. 4 is an end view of the relay with certain parts broken away and others in section. Fig. 5 is a diagrammatic illustration of the receiving station in a system embodying one form of my invention, it being understood that for the complete system Figs. 1 and 5 are to be considered together. Figs. 6 and 7 are side and end views of a relay such as is indicated in Fig. 4. Fig. 8 shows an alternative method for supplying current to the coils Q, Q' of Fig. 4. Fig. 9 illustrates diagrammatically another modification in the apparatus which is shown at the receiving station end of the line. Fig. 10 is a side view partly in section of the relay indicated in Fig. 8. Figs. 11 and 12 are plan and end views, respectively, of the same relay.

So far as the system is shown in Figs. 1, 2, 3 and 4, I make no specific claims thereto since the subject matter of this portion of the system is shown and claimed in my other application, above referred to. I will, however, first describe this portion of the system.

Referring to Fig. 1 A indicates transformers at the power station supplying a three phase current to the three station buses 1, 2, 3. The star connected secondaries have a neutral $a$ connected to ground, as indicated, an impedance $i$ being included in this neutral. 7, 8, 9 and 10, 11, 12 are the conductors of two transmission lines connected in parallel by the buses 1, 2, 3 and also at the receiving station by the buses 4, 5, 6, (Figs. 4, 7 and 8). C and C' represent circuit breakers in the power station adapted to disconnect the respective lines from the buses in the power station. E indicates a battery constituting a source of power for supplying current to tripping and closing circuits of the circuit breakers, these circuits being represented by broken lines. $c, c'$ represent tripping coils of the two circuit breakers which are actuated to open the circuit when their respective tripping coils are energized by the closing of their circuits. $e, f$ are coils for closing the circuit breakers, these coils being in circuits connected to the batteries and controlled by the hand switches $h$.

Referring to Figs. 2, 3 and 4, which show the relay diagrammatically illustrated in Fig. 1, L is a pivoted arm carrying iron armatures $l$, the arm being pivoted in the center and normally balanced between opposing springs $l'$. This arm is acted upon oppositely by coils M, M' of electro-magnets suitably supported upon base N below the armatures $l$. If substantially unequal currents are supplied to these coils M, M', the one having the greater current will attract its armature and move the arm in one direction or another from its balanced position. By doing so one of the tripping circuits is closed between a contact $m$, carried at the end of the arm, and a spring $m'$ suitably supported from the base N.

O, O', O², and O³ are coils for operating stops or blocking members, each pair (O and O'; O² and O³) of coils being adapted to act oppositely upon one of the common cores $o$ each of which engages a pivoted member $o'$. Each common core with its stop $o'$ has two positions, the stop being thrown to a vertical position to block arm L when the setting coil is energized and being thrown to an inclined position when its releasing coil is energized; the stop always remaining in its last operated position until again positively thrown to its other position. Coils O' and O² are in the respective tripping circuits so that when coil M, for example, has attracted its armature, closing the tripping circuit of the coil $c$ to open circuit breaker C, then coil O² at the opposite end of the relay operates upon a stop or blocking arm $o'$ to pull the arm to the vertical position and preventing the movement of the relay in the direction to open circuit breaker C' after circuit breaker C has opened. This would otherwise take place provided one of the circuit breakers at the power station opens and neither of those hereinafter described at the receiving station has yet opened, because after the opening of the circuit breaker the current to ground immediately passes through the unopened transmission line to the fault by way of the receiving station and the distant end of the disconnected line, and this current would operate to cut out the circuit breaker of the line that is not at fault. If the relay had operated to open circuit breaker C' instead of circuit breaker C, then the movement of the relay to effect this purpose also energizes coil O and causes it to raise its arm $o'$. These stop arms $o'$ are moved from under the arm L so as to unblock the same by the coils O', O³ each respectively in the closing circuits of the closing coils $f$, $e$, whereby when the fault has been repaired and the circuit breaker has again closed the arm L is unblocked and free to move to either of its operative positions when magnets M—M' are energized.

The coils M, M' are connected respectively to the external circuits of the parallel connected secondaries of two sets of series transformers, P, P'. The set of transformers P comprises three transformers whose primaries are in series in the transmission lines 7, 8 and 9 at the power station, while the set of transformers P' are similar transformers placed in the conductors 10, 11, 12 at the power station. Before considering in further detail what occurs at the receiving station and the necessities at that point, I will point out the operation of the apparatus thus far described at the power station. X indicates a fault in the form of a ground developed in the transmission line 12. Prior to the development of this fault the relay arm is in the balanced position shown in Figs. 1 and 3, and no current is flowing in the coils M or M' because the only currents passing over the transmission lines are the power currents and the algebraic sums of these currents are equal to zero. Before the development of the fault, also, all the circuit breakers are closed, while the tripping and closing circuits thereof are opened. Upon the development of the fault at X current will flow to the fault from the bus 3 taking two paths to the fault, one through the conductor 12 and the other through the conductor 9, bus 4 and distant end of conductor 12, the two paths uniting at the fault and flowing through the earth to the neutral $a$ of the star connected power secondaries. These two currents produce currents in the neutrals of the two sets of transformers at the power station and therefore current is supplied both to the coil M and to the coil M'. If the two transmission lines have equal conductivity, the current in the coil M' will be the greater, the extent of this being dependent upon the position of the fault along the conductor 12. We can assume for purposes of considering the specific operation of the system, that the two lines are of equal conductivity, although this is not at all essential to my invention, it being one object of my invention to supply an operative and efficient means whatever the relative conductivity of the two lines. Where the lines differ in conductivity the coils M and M', or the two sets of transformers, are designed differently. If the fault X is not too close to the distant receiving station the current in coil M' will be sufficiently greater than that in the coil M to cause the lever L to be actuated to close the tripping circuit of the tripping coil $c'$, thus opening the circuit breaker C'. The faulty line is thus disconnected at the power end. The action of the stop setting and releasing coils has already been described. If the fault X is so close to the receiving station that the currents in the two paths to the fault are so nearly equal that relay L is not actuated, then the circuit breaker C' will not be opened until after the circuit breaker D' at the other end of the faulty line has been opened as will be hereinafter explained. If circuit breaker D' has opened all the current flowing to the fault will flow through the conductor 12 and none of it through the conductor 9 which will cause a heavy current to flow through the coil M' and none through coil M, resulting in the opening of circuit breaker C'.

Referring now to the receiving station, I will first describe the specific embodiment diagrammatically indicated in Fig. 5 including the specific relay shown in Figs. 6 and 7. It is understood that in considering Fig. 5 it is to be considered as a part of the system the other part being shown in Fig. 1. $P^2$ and $P^3$ are sets of series transformers one set for each line, and each set comprises three series transformers with parallelly connected secondaries similar to the sets of transformers P and P' at the power station. The external circuits of these transformers are so united by the conductors 13, 14 as to reversely connect the two sets of secondaries together. Connected between these conductors 13, 14 are the coils $M^2$ and $M^3$. These are carried by relay arm L' adapted to close according to its direction of movement, the circuit either of the tripping coil $d$ of circuit breaker D in one of the transmission lines, or the tripping coil $d'$ of circuit breaker D' in the other transmission line. $g$ and $h$ are the closing coils for these circuit breakers. B' refers to a set of power transformers which may be of any type. R refers to potential transformers whose primaries are star connected and whose secondaries are delta connected. The neutral of the star is connected to ground by conductor $a^2$, as indicated, and in this conductor is supplied a series transformer which may have in series with it a limiting resistance $r'$. The secondary of the transformer $r$ is connected to supply current to coils Q and Q' which are supported upon the base N' that supports the relay arm L'. E' is a battery at the receiving station supplying power for the tripping and closing circuits.

Normally there is no current in the coils $M^2$ and $M^3$ because the algebraic sums of the normal currents of the transmission lines are each equal to zero. Normally also there is no current in the coils Q and Q' since there is normally no current in the grounded conductors $a^2$. When, however, a fault develops on any one of the six conductors currents are produced by the sets of secondaries $P^2$, $P^3$, which form a resultant current in coils $M^2$ and $M^3$ whose phase is dependent not only upon which phase is grounded, but also upon whether one line or the other is the faulty one, since the voltage of the current in $M^2$ and $M^3$ is relatively opposite when one transmission line is grounded to what it would be if the other transmission line were grounded. On the other hand, upon the development of a fault one of the primaries of transformers R becomes short-circuited and the current produced in the secondaries of these transformers causes the secondary of the grounded transformer to act as a primary and supply current to a circuit including the grounded transmission conductor, and the grounded conductor $a^2$. This produces a current from transformer R supplied to coils Q, Q' which is dependent for its phase upon the phase of the grounded transmission conductor but which is of the same phase or polarity regardless of which line contains the faulty conductor. This may be illustrated by assuming a ground on conductor 12 as indicated in Fig. 1 at X. Under these circumstances current will pass to the fault X through the conductor 9 including the series transformer in that line at the receiving station, thence through the bus 4 and the distant end of the conductor 12 including its series transformer at the receiving station. This current passes in relatively opposite directions through the two series transformers at the receiving station.

It will be understood that there may be sufficient power current with any given degree of fault so that the only resultant currents in the series transformers of conductors 9 and 12 at the receiving station will be in the same relative direction, but the disturbance caused by the fault will be of such a character as to produce the same effect upon the external circuits of such secondaries as if only the current to the fault were flowing. For simplicity of explanation, therefore, the power current may be eliminated from consideration. This current, passing oppositely through conductors 9 and 12, creates currents from the two sets of secondaries which currents unite in coils $M^2$ and $M^3$. The phase of that current is obviously definitely related to the phase of conductors 9 and 12, but has one phase when the fault, as indicated, is in the conductor 12, while it would have an exactly opposite phase if the fault were in the conductor 9 instead.

Upon the development of the fault at X that primary of the transformers R which is connected between bus 4 and the neutral $a^2$ is short-circuited through bus 4, conductor 12 and ground so that, as previously explained, this particular transformer becomes reversed so that its primary supplies current to this grounded circuit. This causes transformer $r$ to supply current to coils Q, Q' which current has a definite phase relation to that of the normal current of conductors 9 and 12. It will be noted that coils $M^2$ and $M^3$ are reversely connected in their circuit, while coils Q and Q' are connected in straight series in their circuit. As a result, one set of coils $M^2$, Q will repel each other, while the other set $M^3$, Q' will attract each other, thus causing a movement of the relay arm L in a direction to close the tripping circuit to energize coil $d'$ and actuate circuit breaker $D'$. If the fault had been on conductor 9 instead of conductor 12 the current would be of the same phase in coils Q, Q', but of opposite phase in coils $M^2$, $M^3$ and therefore coils $M^3$ and Q' would have repelled each other, while coils $M^2$ and Q would have attracted each other closing the circuit of the coil $d$ to actuate the circuit breaker D. It will be noted that the two sets of co-acting coils for the relay arm L' are merely cumulative as each set acts to move the relay toward the proper position.

The relay indicated in Fig. 5 is structurally shown in Figs. 6 and 7. Relay arm L' is suitably pivoted at its center, the pivoted support being carried from a base N'. To this base, and at opposite sides of the pivotal point, are secured two of the coils, as Q, Q', while secured to the lever arm L' are the other coils, as $M^2$, $M^3$. The relay arm is normally held in a central position by the springs $l'$, and the circuit to either tripping coil is completed by the engagement of one or other of the contact screws $m$ with the contact springs $m'$ carried from the base.

In Fig. 8 I have shown another method of producing the current that has a definite phase relation to the normal phase of the grounded conductor. The conductors $q$ are those which supply a current to the coils Q, Q' of Fig. 5, it being understood that all the other apparatus shown at the left of the buses 4, 5, 6 in Fig. 5 may be employed with the modification shown in Fig. 8. $P^4$ and $P^5$ are sets of series transformers having their secondaries connected in parallel and placed in the main line leading out from the buses 4, 5, 6 to the power transformers at the receiving station. The currents to the fault will not flow through these transformers. Nevertheless with a fault developed on a transmission line to the left of the buses 4, 5, 6 there will be a current developed in the external circuits of these transformer sets. This current will be produced by reason of the fact that one conductor of each set is at the same potential as ground while the other two conductors are at a high potential above ground and, therefore, there will be a charging current due to the condenser action between the primary windings of the power transformers at the receiving station and the ground. The impedance $i$ in the grounded neutral at the power station prevents the grounded phase from becoming substantially short circuited, enabling high potentials to be applied to the system. There is a charging current in each of the conductors of the ungrounded phase, but not in the conductor of the grounded phase. This charging current develops a current in the neutral circuits of the secondaries which will have a definite phase relation to that of the grounded phase and this current may be utilized in coils Q and Q' to coöperate with the currents of the coils $M^2$ and $M^3$ exactly as in the case of Fig. 4. It is not material how many sets of transformers are used to obtain this charging current, and in case two or more are used it is not essential that the different sets should be in separate lines in series with separate power transformers as illustrated in the drawings.

In Fig. 9 I have shown another form of relay and circuit arrangements at the receiving station, this relay being one that may be used not only to open the circuit breaker in the faulty line, but also to indicate which conductor is the faulty one. Referring first to the constructional features of the relay shown in Figs. 10 to 12, the movable member of the relay has six radially extending arms $L^2$. Alternate arms carry coils $M^4$, while supported from a base $N^2$ are three co-acting coils $Q^2$. Alternate radial arms which are diametrically opposite the coil carrying arms, are connected to the base $N^2$ by springs $l^2$ and by dash pots $l^3$. The movable member is mounted on a ball and socket joint $l^4$ from a support mounted on the base $N^2$. The six arms $L^2$ carry contacts $M^2$ immediately above contacts $s^2$ carried from the base. The moving member has six positions to which it can be moved from its normal position according to the phases of the currents in the coils $M^4$. When the phases are such that any two of the co-acting coils will attract each other, then the other two sets of co-acting coils repel each other and all three sets of coils co-act to produce a movement of the movable member to one of its six positions. If the phases are such that the same two coils act to repel, then the other two sets will act to attract and the movable member is moved to the opposite position. In this way, according to the six possible phases that may be given to the coils $M^4$ (the phases of coils $Q^2$ being definitely fixed as hereinafter explained), the relay may take any one of its six positions, corresponding to the six conductors of the two lines.

By now referring to Fig. 9 by which the various circuit connections may be seen, the operation of this relay can be made clear. The coils $M^4$ carried by the movable member of the relay are connected to the external circuits of the transformer sets $P^2$, $P^3$ exactly as were the coils $M^2$, $M^3$. Normally these coils $M^4$ are without current but upon the development of a fault a current will be produced in these coils, as already explained, which current will have a phase dependent upon which phase is grounded and also upon which line contains the grounded conductor. In other words, there are six possible phases for the current in these coils $M^4$. Coils $Q^2$ are supplied in any suitable way to receive currents having respectively phases in definite relation to the normal phases of the system. In the present instance these coils $Q^2$ are shown as supplied by branches from the secondary of one of the power transformers B' at the receiving station. The exact phase relation may be adjusted by resistances or other devices $r^2$. The fixed and movable parts of the relay are shown in Fig. 10 as slightly displaced circularly in order that the various parts may more clearly appear. The battery E' is connected to the movable member of the relay by conductor $e$, and thereby to all of the contacts $M^2$. Three of the contacts $s^2$ are all connected to a conductor $e'$ which is connected in the circuit of the tripping coil $d$ of the circuit breaker D. The other three contacts $s^2$ are connected to a conductor $e^2$ which is in the circuit of the tripping coil $d'$ of circuit breaker D'. When, therefore, any one of these conductors develops a fault there will be a current in coil $M^4$ that has one of six possible phases. The coils $Q^2$ are being supplied with currents of three phases 120 degrees apart. The current in coil $M^4$ may therefore be of a phase that will either strongly attract or strongly repel the current in one of the coils $Q^2$. Let us assume for instance that the fault is such that a current in the coils $M^4$ is practically in phase with the current in one of the coils $Q^2$. These two coils will repel each other and tend to move the relay so as to close the tripping circuit of the circuit breaker D at a point diametrically opposite the position of the repelling coils. The phase in the other two coils $M^4$ will be the same, whereas the phase of the other coils $Q^2$ will be 120 degrees from each other and from that of the repelling coil. Each of the other two pairs of coils will therefore have relative currents of such phase as to cause a slight attraction between each pair of coils $M^4$ and $Q^2$ which will serve to assist the stronger repulsive action of the first pair of coils. As indicated, therefore, by the diagram in this particular embodiment, a fault in any one of the conductors 10, 11 and 12 will cause an attraction between the members of one of the three sets of coils and a slight coöperating repulsion between the members of the other two pairs of coils, the resultant effect being that the relay is moved to one of three positions, any one of which opens the circuit breaker D', while the conductor that is at fault may be ascertained by noting to which of the three positions the relay has been moved. Unless the attendant has chanced to be observing the relay when first actuated by the fault, he should close the circuit-breaker after it has been opened by the relay and allow the latter to again be actuated to open the circuit-breaker when he can note the position to which the relay is moved. On the other hand, if a fault has developed in any one of the lines 7, 8 and 9 there is a strong repulsive action set up between the members of one of the three pairs of coils and a weak coöperating attractive action between the members of the other two pairs of coils, causing the movement of the relay to one of three positions that will open the circuit breaker D', while the position of the faulty conductor may again be ascertained by noting to which of the three positions the relay has been moved. The specific embodiment of my invention illustrated in Figs. 9 to 12 is not claimed in this application, the same being reserved for the specific subject matter of another application.

It will be understood that it is the ordinary practice in the art to employ resistances, condensers and inductances in various ways to suitably adjust the phase relation of different circuits and that such may be employed in connection with my invention to properly attain the desired results. I have not encumbered the drawings with such devices as I deem that any one skilled in the art from the foregoing explanation will make such adjustments of the phase relation of the different circuits as will cause the operation of the system in accordance with the principles I have set forth.

I desire it to be understood that the principles of my invention as herein set out are broader than any or all of the specific embodiments that I have illustrated and that I do not wish to be limited to any mere details shown and described in connection with any or all of said embodiments of my invention, since these details may be modified in many ways without departing from my invention as set forth in the appended claims.

Having thus described my invention, what I claim as new and desire to secure by Letters Patent is:

1. Two parallel polyphase transmission lines, a circuit breaker in each, means responsive to the development of a fault in any one conductor of either line for producing a current with a phase depending upon which line contains the fault, means also responsive to the development of the fault for producing another current having the same phase whichever line is at fault, and means acted upon coöperatively by said currents and acting selectively according to the relative phases thereof for actuating the circuit breaker in the faulty line.

2. Two parallel polyphase transmission lines, a circuit breaker, means responsive to the development of a fault for producing a current with a phase depending upon which line contains the fault, means also responsive to the development of the fault for producing another current having the same phase whichever line is at fault, and means acted upon coöperatively by said currents for actuating the circuit breaker.

3. Two parallel polyphase transmission lines, a circuit breaker, means responsive to the development of a fault for producing a current with a phase depending upon which line contains the fault, means also responsive to the development of the fault for producing another current having the same phase whichever line is at fault, a movable member operatively arranged to actuate said circuit breaker, a coil receiving said first mentioned current and means for causing the current in said coil when of a given phase to move said member to actuate the circuit breaker.

4. Two parallel polyphase transmission lines, a circuit breaker, means responsive to the development of a fault for producing a current with a phase depending upon which line contains the fault, means also responsive to the development of the fault for producing another current having the same phase whichever line is at fault, a movable member operatively arranged to actuate said circuit breaker, a coil receiving said first mentioned current and means for causing the current in said coil to oppositely move said member according to the phase of said current.

5. Two parallel polyphase transmission lines, a circuit breaker in each, means for producing two electro-motive-forces determined by the algebraic sums of the currents of the two transmission lines, a circuit to which both of said electro-motive-forces are applied, and means for selectively actuating said circuit breakers according to the phase of the current in said circuit.

6. Two parallel polyphase transmission lines, a circuit breaker in each, means for producing two electro-motive-forces determined by the algebraic sums of the currents of the two transmission lines, a circuit to which both of said electro-motive-forces are applied, means for producing a second current having a phase that is the same whichever line is at fault, and means for selectively actuating said circuit breakers by the coaction of said currents.

7. Two parallel polyphase transmission lines, a circuit breaker in each, means for producing two electro-motive-forces determined by the algebraic sums of the currents of the two transmission lines, a circuit to which both of said electro-motive-forces are applied, means for producing a second current having a phase that is the same whichever line is at fault, a movably mounted member actuated by the coaction of said currents and arranged to operate the respective circuit breakers when it is moved in different directions.

8. Two parallel polyphase transmission lines, power and receiving stations at which said lines are connected, a circuit breaker in one of the lines at the receiving station, means for producing an electro-motive-force determined by the algebraic sum of the currents in one of the transmission lines, and means the operation of which is dependent upon the phase of said electro-motive-force for actuating said circuit breaker.

9. Two parallel polyphase transmission lines, power and receiving stations at which said lines are connected, a circuit breaker in each at the receiving station, means for producing an electro-motive-force determined by the algebraic sum of the currents in one of the transmission lines, and means acting according to the phase of said electro-motive-force for actuating one or other of said circuit breakers.

10. Two parallel polyphase transmission lines, power and receiving stations at which said lines are connected, a circuit breaker in each at the receiving station, means for producing an electro-motive-force determined by the algebraic sum of the currents in one of the transmission lines, means for producing another electro-motive-force having the same phase if either line contains a fault, circuits to which said electro-motive-forces are applied, and means for causing currents in said circuits to coact to selectively actuate a circuit breaker.

11. Two parallel polyphase transmission lines, power and receiving stations at which said lines are connected, a circuit breaker in each at the receiving station, means for producing an electro-motive-force determined by the algebraic sum of the currents in one of the transmission lines, means for producing another electro-motive-force having the same phase if either line contains a fault, circuits to which said electro-motive-forces are applied, coöperatively arranged coils in said circuits, and a relay controlling said circuit breakers and governed by the conjoint action of said coils.

12. Two polyphase transmission lines, power and receiving stations at which said lines are connected, a series transformer in each conductor of one of the lines at the receiving station, the secondaries of the transformers being connected in parallel, a coil in the external circuit of said secondaries, a circuit breaker at the receiving station in one of said lines, and means for actuating said circuit breaker responsively to the presence of current of given phases in said coil.

13. Two polyphase transmission lines, power and receiving stations at which said lines are connected, a series transformer in each conductor of one of the lines at the receiving station, the secondaries of the transformers being connected in parallel, a coil in the external circuit of said secondaries, a second coil and means for supplying it with current, a circuit breaker at the receiving station in one of said lines, and means for causing said coils to magnetically react with each other to actuate the circuit breaker.

14. Two polyphase transmission lines, power and receiving stations at which said lines are connected, a series transformer in each conductor of one of the lines at the receiving station, the secondaries of the transformers being connected in parallel, a coil in the external circuit of said secondaries, a second coil and means for supplying it with current, a circuit breaker at the receiving station in one of said lines, a movable member operatively related to said circuit breaker and carrying one of said coils, and a base supporting the other coil in magnetic proximity to the movably mounted coil.

15. Two polyphase transmission lines, power and receiving stations at which said lines are connected, a series transformer in each conductor of one of the lines at the receiving station, the secondaries of the transformers being connected in parallel, a coil in the external circuit of said secondaries, a second coil and means for supplying it with current, a circuit breaker at the receiving station in each of said lines, and means for causing said coils to magnetically react with each other to selectively actuate a circuit breaker.

16. Two polyphase transmission lines, power and receiving stations at which said lines are connected, a series transformer in each conductor of one of the lines at the receiving station, the secondaries of the transformers being connected in parallel, a coil in the external circuit of said secondaries, a second coil and means for supplying it with current, a circuit breaker at the receiving station in each of said lines, a movable member operatively related to both of said circuit breakers and carrying one of said coils, and a base supporting the other of said coils in magnetic proximity to the movably mounted coil.

17. Two polyphase transmission lines, power and receiving stations at which said lines are connected, a series transformer in each conductor of each of the lines at the receiving station, the secondaries of each set being connected in parallel, conductors reversely connected to the two sets of secondaries, a coil connected across said conductors, a circuit breaker at the receiving station in one of said lines, and means for actuating said circuit breaker responsively to the presence of current of given phases in said coil.

18. Two polyphase transmission lines, power and receiving stations at which said lines are connected, a series transformer in each conductor of each of the lines at the receiving station, the secondaries of each set being connected in parallel, conductors reversely connected to the two sets of secondaries, a coil connected across said conductors, a circuit breaker at the receiving station in one of said lines, a second coil and means for supplying it with current, and means for causing said coils to magnetically react with each other to actuate the circuit breaker.

19. Two polyphase transmission lines, power and receiving stations at which said lines are connected, a series transformer in each conductor of each of the lines at the receiving station, the secondaries of each set being connected in parallel, conductors reversely connected to the two sets of secondaries, a coil connected across said conductors, a circuit breaker at the receiving station in one of said lines, a second coil and means for supplying it with current, a movable member operatively related to said circuit breaker and carrying one of said coils, and a base supporting the other coil in magnetic proximity to the movably mounted coil.

20. Two polyphase transmission lines, power and receiving stations at which said lines are connected, a series transformer in each conductor of each of the lines at the receiving station, the secondaries of each set being connected in parallel, conductors reversely connected to the two sets of secondaries, a coil connected across said conductors, a circuit breaker at the receiving station in each of said lines, and means for causing said coils to magnetically react with each other to selectively actuate a circuit breaker.

21. Two polyphase transmission lines, power and receiving stations at which said lines are connected, a series transformer in each conductor of each of the lines at the receiving station, the secondaries of each set being connected in parallel, conductors reversely connected to the two sets of secondaries, a coil connected across said conductors, a circuit breaker at the receiving station in each of said lines, a movable member operatively related to both of said circuit breakers and carrying one of said coils, and a base supporting the other of said coils in magnetic proximity to the movably mounted coil.

22. Two parallel polyphase transmission lines, a power station and a receiving station at which said lines are connected, a circuit breaker in each at the receiving station, means responsive to the development of a fault for producing a current, means for producing a second current determined by the relation between the charging currents in the line conductors, and means for selectively actuating one of said circuit breakers by the magnetic coaction of said currents.

23. Two parallel polyphase transmission lines, a power station and a receiving station at which said lines are connected, a circuit breaker in each at the receiving station, means responsive to the development of a fault for producing a current, means for producing a second current determined by the relation between the charging currents in the line conductors, a movable member operatively related to both circuit breakers, and coils supplied by the respective currents and arranged to magnetically coact to move said member in one direction or another according to the relative phases of the currents in said coils.

24. A polyphase transmission line, a circuit breaker therein, a relay controlling said circuit breaker, having relatively movable actuating coils, and means for supplying current to one of the coils determined by the relation between the charging currents of the line conductors.

25. Two parallel polyphase transmission lines, a circuit breaker in each, a movable member operatively related to both circuit breakers, relatively movable coils controlling said movable member, and means for supplying current to one of said coils determined by the relation between the charging currents of the line conductors.

26. Two parallel polyphase transmission lines, a circuit breaker in each, a movable member operatively related to both circuit breakers, relatively movable coils controlling said movable member, means for supplying current to one of said coils determined by the presence of a fault and having a phase dependent upon whether one or other line is at fault, and means for supplying current to the other of said coils dependent upon the relation between the charging currents of the line conductors.

27. A power station, a receiving station, two polyphase transmission lines connected together at each station, a circuit breaker in one line at the receiving station, a set of series transformers with multiple connected secondaries in one line at the receiving station, a set of similar transformers at the receiving station in conductors leading from the joined lines, and coacting coils supplied respectively from said transformer sets and operatively related to said circuit breaker to actuate the same.

28. A power station, a receiving station, two polyphase transmission lines connected together at each station, a circuit breaker in each line at the receiving station, a set of series transformers with multiple connected secondaries in one line at the receiving station, a set of similar transformers at the receiving station in conductors leading from the joined lines, a movable member arranged to actuate either circuit breaker, and coils coacting to actuate said member and supplied respectively from said transformer sets.

29. A power station, a receiving station, two polyphase transmission lines connected together at each station, a circuit breaker in each line at the receiving station, a set of series transformers with multiple connected secondaries in each line at the receiving station, a set of similar transformers at the receiving station in conductors leading from the joined lines, a movable member arranged to actuate either circuit breaker, and coacting coils operatively related to said member to actuate the same, one of said coils being supplied by the transformer sets of the separate lines and the other being supplied by the transformer set of the joined lines.

In testimony whereof, I have signed my name to this specification, in the presence of two subscribing witnesses.

LLOYD CARLTON NICHOLSON.

Witnesses:
    FRANCIS B. H. PAINE,
    R. C. DOWNING.

Correction in Letters Patent No. 959,788.

It is hereby certified that in Letters Patent No. 959,788, granted May 31, 1910, upon the application of Lloyd Carlton Nicholson, of Buffalo, New York, for an improvement in "Circuit-Controlling Apparatus," an error appears in the printed specification requiring correction as follows: Page 2, lines 87 and 89, the abbreviation and numeral "Fig. 4" should read *Fig. 5;* and that the said Letters Patent should be read with this correction therein that the same may conform to the record of the case in the Patent Office.

Signed and sealed this 12th day of July, A. D., 1910.

[SEAL.]
C. C. BILLINGS,
*Acting Commissioner of Patents.*